US011118063B2

(12) United States Patent
Zang et al.

(10) Patent No.: US 11,118,063 B2
(45) Date of Patent: Sep. 14, 2021

(54) SUPER-HYDROPHOBIC MANGANESE DIOXIDE COATING ON METALLIC MATERIAL SURFACES AND PREPARATION METHOD THEREOF

(71) Applicant: East China Jiaotong University, Nanchang (CN)

(72) Inventors: Dongmian Zang, Jiangxi (CN); Xiaowei Xun, Jiangxi (CN); Jiaojiao Dong, Jiangxi (CN); Ting Pan, Jiangxi (CN)

(73) Assignee: East China Jiaotong University, Nanchang (CN)

( * ) Notice: Subject to any disclaimer, the term of this patent is extended or adjusted under 35 U.S.C. 154(b) by 180 days.

(21) Appl. No.: 16/528,386

(22) Filed: Jul. 31, 2019

(65) Prior Publication Data

US 2020/0224036 A1 Jul. 16, 2020

(30) Foreign Application Priority Data

Jan. 11, 2019 (CN) ......................... 201910030002.8

(51) Int. Cl.

| | |
|---|---|
| ***C09D 1/00*** | (2006.01) |
| ***C23C 2/02*** | (2006.01) |
| ***C23C 2/04*** | (2006.01) |
| ***C23C 2/26*** | (2006.01) |

(52) U.S. Cl.
CPC .................. *C09D 1/00* (2013.01); *C23C 2/02* (2013.01); *C23C 2/04* (2013.01); *C23C 2/26* (2013.01)

(58) Field of Classification Search
None
See application file for complete search history.

(56) References Cited

FOREIGN PATENT DOCUMENTS

| | | | |
|---|---|---|---|
| CN | 107215901 | A | 9/2017 |
| CN | 107740091 | B | 8/2018 |
| CN | 108704489 | A | 10/2018 |

*Primary Examiner* — Colin W. Slifka

(57) ABSTRACT

The present invention discloses a durable super-hydrophobic manganese dioxide coating and a preparation method thereof, belonging to the field of metallic material surface treatment. In the method, by using manganese sulfate as a raw material, based on the property of interface reaction, a manganese dioxide coating is synthesized on the metallic material surface by simple and convenient solution impregnation, and then processed by hydrophobization with stearic acid to obtain a super-hydrophobic manganese dioxide coating. This coating has excellent chemical stability to organic solvents such as n-hexane, isooctane, dodecane, tetradecane, and acids, alkali and salt solutions at different pH values, and exhibits great resistance against dynamic water shear and good durability, with broad application prospect.

2 Claims, No Drawings

SUPER-HYDROPHOBIC MANGANESE DIOXIDE COATING ON METALLIC MATERIAL SURFACES AND PREPARATION METHOD THEREOF

CROSS-REFERENCE TO RELATED APPLICATIONS

This application claims the benefit of priority from Chinese Patent Application No. CN 201910030002.8, filed on Jan. 11, 2019. The content of the aforementioned application, including any intervening amendments thereto, is incorporated herein by reference in its entirety.

TECHNICAL FIELD

The present invention relates to the field of metallic material surface treatment, and in particular to a durable super-hydrophobic manganese dioxide coating on a metallic material surface, and a preparation method thereof.

BACKGROUND OF THE PRESENT INVENTION

Super-hydrophobic surfaces have been widely applied in research of metallic material surfaces due to their good self-cleaning, corrosion resistance, antifouling and antibacterial properties. In the prior art, there are two strategies well known to prepare a super-hydrophobic surface: (1) roughening the hydrophobic substrates; and (2) modifying the textured surfaces with low-surface-energy materials. At present, as methods for preparing a super-hydrophobic surface, etching, electrochemical deposition, template-based preparation, electrispinning, sol-gel, anodic oxidation, micro-arc oxidation, dealloying and the like may be used. Those methods requirement special experimental facilities and complex techniques, resulting in limited applications.

As an important functional material, manganese dioxide has good physical and chemical stability and has been widely applied in fields such as catalytic and electrode materials. At present, Mn (II) is usually used as a precursor to create manganese dioxide with the involvement of strong oxidants such as potassium persulfate, potassium permanganate, or electrochemical oxidation. In the present invention, a super-hydrophobic manganese dioxide coating is generated on a metallic material surface by simple and convenient solution immersion, using oxygen in the air as the oxidant.

SUMMARY OF THE PRESENT INVENTION

An objective of the present invention is to provide a super-hydrophobic manganese dioxide coating on a metallic material surface, and a preparation method thereof which is simple and convenient, low in cost, and wide in applicability.

For this purpose, the present invention provides the following solution. The present invention provides a durable super-hydrophobic manganese dioxide coating on a metallic material surface, comprising following components as raw materials: a water-soluble manganese salt, an advanced fatty acid and an organic solvent.

Further, the water-soluble manganese salt is manganese sulfate.

Further, the advanced fatty acid is stearic acid.

Further, the organic solvent is ethanol.

The present invention further provides a method for preparing the durable super-hydrophobic manganese dioxide coating on a metallic material surface, comprising: by using a water-soluble manganese salt as a raw material, depositing manganese dioxide on a metallic material surface, dissolving an advanced fatty acid in an organic solvent, and performing hydrophobization to obtain the super-hydrophobic manganese dioxide coating.

Further, the method for preparing the durable super-hydrophobic manganese dioxide coating on a metallic material surface, comprising steps of:

(1) pre-treating a metallic material;

(2) dissolving the water-soluble manganese salt in deionized water, soaking the treated metallic material in the solution of water-soluble manganese salt for 4-8 hours, taking the metallic material out, cleaning the metallic material with deionized water, and drying; and (3) dissolving the advanced fatty acid in the organic solvent to obtain a solution of advanced fatty acid, soaking the treated metallic material in the step (2) in the solution of advanced fatty acid for 3-6 hours, taking the metallic material out, cleaning the soaked metallic material with the original solvent, and drying to obtain the super-hydrophobic manganese dioxide coating on the metallic material surface.

Further, the pre-treating a metallic material comprises: first, cutting the metallic material, mechanically polishing the cut metallic material successively with 400#, 800#, 1200#, 2000# SiC paper until the metallic material becomes smooth and flat, then cleaning the polished metallic material successively with acetone, anhydrous ethanol and deionized water for 5 minutes to remove impurities and stains on the surface of the polished metallic material, and then drying for future use.

Further, the solution of water-soluble manganese salt has a concentration of 0.01-0.1 mol/L.

The present invention has the following technical effects.

In the present invention, based on the surface activity and the property of interface reaction of a metallic material, manganese dioxide is deposited on a metallic material surface by simple and convenient solution immersion: $2M+nMn^{2+}+2nH_2O=2M^{n+}+nH_2+nMn(OH)_2$, $2Mn(OH)_2+O_2=2MnO_2.H_2O$, wherein $Mn^{2+}$ has a hydrolysis reaction on the metallic material surface to generate $Mn(OH)_2$ which is then oxidized by oxygen in the air to generate a manganese dioxide coating. The stearic acid becomes negatively charged stearate ions after deprotonation in the solution. The stable chemical bonding of the stearate ions to the manganese dioxide coating on the metallic material surface enables the coating to have super-hydrophobicity. The water contact angle of the coating is greater than 150°. Such a super-hydrophobic coating may be prepared on the metallic material surfaces, such as magnesium alloy, stainless steel and cast iron surfaces.

Manganese dioxide has complex crystal structures, including one-dimensional, two-dimensional and three-dimensional tunnel structures with nanochannels, formed by connecting basic units $MnO_6$ in different ways. Due to its special structure, manganese dioxide may be bonded more stably to the stearate ions on the metallic material surface, thereby enabling the coating to have durable super-hydrophobicity.

The preparation method of the present invention is simple and convenient, low in cost, and wide in applicability. This coating has excellent chemical stability to organic solvents such as n-hexane, isooctane, dodecane, tetradecane, and acids, alkali and salt solutions at different pH values, and exhibits great resistance against static water pressure and resistance against dynamic water shear and good durability, with broad application prospect.

DETAILED DESCRIPTION OF THE PRESENT INVENTION

The technical solutions in embodiments of the present invention will be clearly and completely described below in combination with the embodiments of the present invention. Apparently, the embodiments described herein are some but not all of the embodiments of the present invention. All other embodiments obtained by a person of ordinary skill in the art on the basis of the embodiments in the present invention, without paying any creative effort, shall fall into the protection scope of the present invention.

The term "super-hydrophobic", as used here, means super hydrophobicity or the formation of the super hydrophobic property. That is, it is quite difficult to wet. The concept of using a stable contact angle formed by liquid drops on a solid substrate surface as a quantitative measurement of wetting ability of a specific solid is also well known. Wetting is an ability of the liquid in maintaining surface contact with the solid due to the intermolecular interaction, when the liquid comes into contact with the solid surface. The degree of wetting (wettability) is determined by the balance between adhesion and cohesion. It is usually considered that it is hydrophobic, if the stable contact angle between the water drops and the substrate surface is greater than 90°. For example, for water on paraffin, the stable contact angle is about 107°. Many applications require a hydrophobic coating having a great stable contact angle of at least 150°. Such a coating is referred to as super-hydrophobic coating.

Embodiment 1

In the first step, the metallic material is cut, the cut metallic material is mechanically polished successively with 400#, 800#, 1200#, 2000# SiC paper until the metallic material becomes smooth and flat, then the polished metallic material is cleaned successively with acetone, anhydrous ethanol and deionized water for 5 minutes to remove impurities and stains on the surface of the polished metallic material, and then dried for future use;

in the second step, 2.1128 g manganese sulfate is dissolved in 250 ml deionized water to obtain a solution of manganese sulfate, and the pretreated metallic material in the first step is soaked in the prepared solution of manganese sulfate, kept standing for 4 hours, taken out when bubbles on the metallic material surface are reduced, cleaned with deionized water, and dried; and in the third step, 0.7112 g stearic acid is dissolved in 250 ml anhydrous ethanol to obtain a solution of stearic acid, and the pretreated metallic material with a manganese dioxide coating in the second step is soaked in the solution of stearic acid, taken out after standing for 6 hours, cleaned with anhydrous ethanol, and then dried for 5 hours at 60-80° C. to obtain a super-hydrophobic manganese dioxide coating. It is measured that the obtained super-hydrophobic manganese dioxide coating has a static contact angle of 158.4° and a roll angle of 7.6°.

Embodiment 2

In the first step, the metallic material is cut, the cut metallic material is mechanically polished successively with 400#, 800#, 1200#, 2000# SiC paper until the metallic material becomes smooth and flat, then the polished metallic material is cleaned successively with acetone, anhydrous ethanol and deionized water for 5 minutes to remove impurities and stains on the surface of the polished metallic material, and then dried for future use;

in the second step, 2.1128 g manganese sulfate is dissolved in 250 ml deionized water to obtain a solution of manganese sulfate, and the pretreated metallic material in the first step is soaked in the prepared solution of manganese sulfate, kept standing for 6 hours, taken out when bubbles on the metallic material surface are reduced, cleaned with deionized water, and dried; and in the third step, 1.4224 g stearic acid is dissolved in 250 ml of anhydrous ethanol to obtain a solution of stearic acid, and the pretreated metallic material with a manganese dioxide coating in the second step is soaked in the solution of stearic acid, taken out after standing for 5 hours, cleaned with anhydrous ethanol, and then dried for 4 hours at 60-80° C. to obtain a super-hydrophobic manganese dioxide coating. It is measured that the obtained super-hydrophobic manganese dioxide coating has a static contact angle of 162° and a roll angle of 8.2°.

Embodiment 3

In the first step, the metallic material is cut, the cut metallic material is mechanically polished successively with 400#, 800#, 1200#, 2000# SiC paper until the metallic material becomes smooth and flat, then the polished metallic material is cleaned successively with acetone, anhydrous ethanol and deionized water for 5 minutes to remove impurities and stains on the surface of the polished metallic material, and then dried for future use;

in the second step, 4.2255 g manganese sulfate is dissolved in 250 ml deionized water to obtain a solution of manganese sulfate, and the pretreated metallic material in the first step is soaked in the prepared solution of manganese sulfate, kept standing for 8 hours, taken out when bubbles on the metallic material surface are reduced, cleaned with deionized water, and dried; and in the third step, 0.7112 g stearic acid is dissolved in 250 ml anhydrous ethanol to obtain a solution of stearic acid, and the pretreated metallic material with a manganese dioxide coating in the second step is soaked in the solution of stearic acid, taken out after standing for 3 hours, cleaned with anhydrous ethanol, and then dried for 2 hours at 60-80° C. to obtain a super-hydrophobic manganese dioxide coating. It is measured that the obtained super-hydrophobic manganese dioxide coating has a static contact angle of 159.8° and a roll angle of 7.9°.

The static contact angle of the super-hydrophobic manganese dioxide coating in the above embodiments is detected by the following method and device:

the static contact angle of the super-hydrophobic manganese dioxide coating in the above embodiments is detected by a coating contact angle meter (a contact angle meter OCA15EC from Dataphysics, Germany), in accordance with the industrial standards. The detection method belongs to the prior art and is the general knowledge that should be known by a person of ordinary skill in the art. It is not the essential point of the present invention, and will not be explained repeatedly here.

The above embodiments are merely preferred implementations of the present invention and not intended to limit the scope of the present invention. Various variations and improvements made to the technical solutions of the present invention by a person of ordinary skill in the art without departing from the design spirit of the present invention shall fall into the protection scope defined by the claims of the present invention.

What is claimed is:

1. A method for preparing a super-hydrophobic manganese dioxide coating on a metallic material surface, comprising steps of:

(1) cutting the metallic material, polishing the cut metallic material successively with 400#, 800#, 1200# and 2000# SiC paper until the metallic material becomes smooth and flat, then ultrasonically cleaning the polished metallic material successively with acetone, anhydrous ethanol and deionized water for 5 minutes to remove impurities and stains on the surface of the polished metallic material, and then drying;

(2) dissolving manganese sulfate in deionized water, soaking the treated metallic material in the solution of water-soluble manganese salt, standing for 4-8 hours, taking the metallic material out, cleaning the metallic material with deionized water, and drying to obtain a manganese dioxide coating; and (3) dissolving stearic acid in the anhydrous ethanol, soaking the treated metallic material in the step (2) in the solution of stearic acid, standing for 3-6 hours, taking the metallic material out, cleaning the soaked metallic material with the anhydrous ethanol, and drying to obtain the super-hydrophobic manganese dioxide coating, wherein the metallic material is magnesium alloy, stainless steel or cast iron.

2. The method for preparing the super-hydrophobic manganese dioxide coating on the metallic material surface according to claim 1, wherein the solution of water-soluble manganese salt has a concentration of 0.01-0.1 mol/L.

* * * * *